July 29, 1947.  J. J. ALIKONIS  2,424,950
APPARATUS FOR MAKING CONFECTIONERY
Filed Feb. 28, 1945
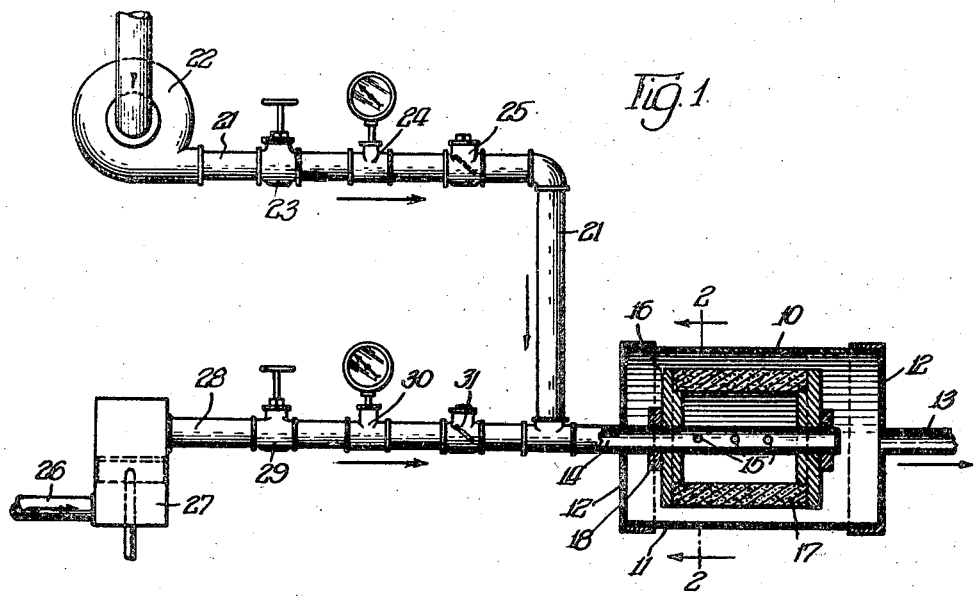
INVENTOR.
Justin J. Alikonis,
BY
Cromwell, Greist & Warden
Attys.

Patented July 29, 1947

2,424,950

UNITED STATES PATENT OFFICE 2,424,950

APPARATUS FOR MAKING CONFECTIONERY

Justin J. Alikonis, Bloomington, Ill., assignor to Paul F. Beich Company, Bloomington, Ill., a corporation of Illinois Application February 28, 1945, Serial No. 580,175

6 Claims. (Cl. 261—94)

This invention relates in general to an apparatus for the production or processing of confectionery or like products in which an aerated, frothy or foamy texture is desired. More particularly the invention relates to a continuous, as distinguished from a batch, procedure for processing or manufacturing such products.

It is a general object of the invention to provide a continuously operable apparatus of the type described wherein desired qualities of foaminess and frothiness may be imparted to the product by a single operation of diffusion of the candy or like stock admixed with a gas through a suitable medium, the only subsequent steps being those of discharging a mass of the diffused stock and, if desired, molding the same in appropriate sizes and shapes.

A further object is to provide an apparatus of the type described in which the mass of stock is automatically guarded against overheating during processing, with consequent elimination of the possibility of destructive results attending overheating.

A still further object is to provide an apparatus in which the overall time for producing confections of the type described is greatly reduced.

Yet another object is to provide an apparatus for the above purposes which is easily cleaned and maintained in hygienic condition.

A still further object is to provide an apparatus which is well adapted for the production of different qualities or textures of candy products of the type under consideration.

Other more specific objects and advantages of the invention will be apparent to those skilled in the art upon a full understanding of the improved method and apparatus herein described.

Preferred embodiments of the invention are presented herein by way of exemplification, but it will of course be appreciated that the invention is capable of being embodied in various other structurally modified forms coming equally within the scope of the appended claims.

In the drawings,

Fig. 1 is a fragmentary diagrammatic or schematic view, partially broken away and in longitudinal vertical section on a line corresponding to line 1—1 of Fig. 2, conventionally illustrating a proposed apparatus for performing the operations involved in the present invention;

Fig. 2 is a view in transverse vertical section, on a line corresponding to line 2—2 of Fig. 1; and Figs. 3 and 4 are fragmentary views in longitudinal vertical section, illustrating details of modified diffusion members adapted to be substituted for the corresponding member appearing in the disclosure of Fig. 1.

In my copending application Serial No. 580,174, filed concurrently herewith, I illustrate and describe a method and apparatus for the processing of confectionery and like stock, involving the introduction of air or a similar gaseous medium and thorough diffusion throughout a mass of confectionery stock prior to and during an operation of beating or agitating the latter.

The present invention differs from the above in that its basic concept involves the diffusion of both the gaseous medium and the mass of confectionery stock through a porous mechanical diffusing agent, whereby intimate diffusion of millions of air globules or bubbles throughout the mass of the stock is effected in a single, continuous operation. Hence the manufacturing time is substantially reduced as compared to presently practiced batch procedures involving a beating operation.

Referring to the drawings, in Fig. 1 I illustrate conventionally a system or apparatus for performing the method of the present invention. The reference numeral 10 in this figure designates a diffuser from which the finally processed product or mass of stock is discharged, ordinarily but not always, to molding means (not shown). The diffuser chosen for illustration, a type with which I have achieved very satisfactory results, consists of a cylindrical chamber 11 closed at opposite ends by centrally apertured plates or disks 12, one of which has a discharge pipe 13 connected thereto communicating through the plate aperture with the interior of the chamber. The opposite end closure plate 12 has a supply pipe 14 disposed in the central aperture thereof and extending into the chamber 10.

Pipe 14 is intended to have a continuously flowing viscous liquid mass of candy stock and air under pressure supplied therethrough and is perforated at 15 internally of the chamber 10 for the discharge of said mass of stock and air. Surrounding the pipe 14 and perforations 15 therein I provide a diffuser member generally designated 16. This member consists of a hollow cylindrical foraminated diffuser sleeve 17 fabricated of a suitable porous material, preferably a ceramic such as aloxite ($Al_2O_3$) or Carborundum. This sleeve is chosen in a grade of suitable porosity or permeability to pass radially and diffuse and intermix the viscous liquid mass and the air which are supplied through pipe 14 and perforations 15. The ends of the sleeve 17 in the illustrated form are closed by apertured disks which centrally receive pipe 14 and said disks are maintained in operative relation to the sleeve by nuts 18 or other appropriate corresponding devices.

In Fig. 3 I illustrate a diffuser 10' corresponding in general to diffuser 10, except for the fact that the porous diffusion element, designated 16', is fabricated of a material such as that described in the form of a flanged cup integrally closed at one end and secured in place between the cylindrical chamber 11' and the apertured closure plate 12' at the supply end of the diffuser.

In Fig. 4 I illustrate a still further modified form of diffuser, designated 10", wherein diffusion is accomplished through a plurality of disks 19 of the above described porous material disposed end-to-end in the chamber member 11". The disks are of diameter corresponding to the inner diameter of said last named member and held in place therein by washers of rings 20. The porosity of the respective disks 19 may be varied as described, ranging from coarse to fine, or any desired selection may be indulged in, either in type of material or quantity of disks, depending upon the composition, consistency and pressure of the mass of stock charged to the system or the desired texture of the final product.

The liquid mass of confectionery stock is supplied under pressure to pipe 14 through a conduit 21 communicating said pipe with a centrifugal pump 22. Included in this conduit are a manual control valve 23, a pressure gauge 24, and a simple one-way flap valve 25 whereby reverse flow of the liquid mass is prevented at this point. This mass of stock may be of any desired composition (within the limitation to be hereinafter referred to), such as a marshmallow mixture or combinations of ingredients of any desired heavier bodied product.

The compressed air is supplied by a pipe or conduit 26 to a reciprocating plunger and cylinder or other appropriate type air compressor 27 adapted to forward the same to the diffuser. From the compressor 27 the air is discharged to a conduit 28 in which are disposed a manually controlled valve 29, a pressure gauge 30, and a flap valve 31. Leaving valve 31, which prevents reverse flow at that point, the air joins the liquid in conduit 21 in entering pipe 14 to the diffuser.

For purpose of illustration, the air pressure may be, say, 60 pounds, it being understood that the air is supplied to pipe 14 simultaneously with a viscous mass of liquid stock, and the viscous liquid stock may be assumed to be at a temperature of about 120° F. as supplied to the diffuser and at a pressure which will vary in accordance with the desired rate of production or desired characteristics of texture of the final product; in any event the pressure on the liquid will be in excess of the air pressure in conduit 28, stated to be about 60 lbs. per sq. in. A preliminary admixture of air and confectionery stock occurs immediately upon impingement of the air and stock, causing the air to be thoroughly distributed in the flowing body of liquid stock, with a beneficial effect on the subsequent operation of dispersion and working of the air-liquid mixture.

The air and liquid issue from pipe 14 through perforations 15 to the interior of, thence through, the diffuser sleeve 17. In traveling along pipe 14, and in particular upon emission from perforations 15 to the interior of sleeve 17, a preliminary pre-foaming mixture of the air and viscous stock occurs resulting in globulization of the mass to a considerable extent. In passage through said sleeve the air is finely and copiously diffused in millions of globules throughout the liquid mass so as to saturate and fully aerate the same, while at the same time a very thorough and effective mechanical working and mixing of the mass is performed as the same travels through the interstices of the porous element. Upon emission from said sleeve to the interior of the cylindrical chamber 11 the stock is in a fluffy, foamy condition and saturated with air and is discharged from the diffuser through pipe 13 in a condition immediately available in many cases for molding. The same results occur when the diffuser is constructed as shown in either Fig. 3 or Fig. 4. The preliminary mixing and distribution of the air throughout the mass of liquid, which occurs in pipe 14 prior to the above diffusion operation, has the important effect of preventing furrowing or channeling of the air through the liquid stock, as might occur if the blast of air were introduced directly at the dispersion zone. This would of course destroy all uniformity of dispersion action and, in fact, tend to eliminate the same entirely. However, such tendency is insured against in the preliminary mixing and foaming phase. As a consequence, the liquid issues through the perforations 15 to fill the interior of the sleeve 17 in an already aerated condition having bubbles of air uniformly distributed throughout. Subsequent diffusion through the sleeve is void of blast effects and uniform working of the entire output is assured.

In the foregoing description I have referred to a mass of confectionery stock being fed to the diffuser. In the manufacture of marshmallow and similar light bodied products, of specific gravity in the neighborhood of 0.4 to 0.6, it is satisfactory to employ the apparatus and steps described above in a single operation, whereby all ingredients are embodied in the stock charged to the diffuser and the finished product is ready for molding immediately upon issuing from the discharge pipe 13. However, in the case of certain other products of heavier character, it is desirable, due to inherent limitations of the diffuser material, that the air-liquid diffusion be performed only on the relatively light bodied ingredients, such as egg albumen or soya protein, flavoring, etc., incorporated in said product, or equivalent more readily diffused materials. Following diffusion the mixed and aerated mass is discharged and then mixed with a pre-cooked portion consisting of syrup, sugar, gelatinous and/or heavier ingredients. This procedure will ordinarily be followed in processing of nougat, fudge or similar confections containing air.

The foregoing method and apparatus are extremely rapid, enabling the rapid production of diffused, frothy confectionery and like products of high quality in a continuous operation as distinguished from hitherto relied on batch methods. Moreover, the air-liquid diffusion operation is self-cooling, i. e., the confectionery stock is prevented from overheating by the passage and intermixture of air therein. Hence the product will not go flat due to swelling and bursting of air bubbles as a result of overheating.

Density of the product can be controlled easily by varying the relative proportions of air and liquid at the valves 23, 29 and current production needs can be similarly controlled, all without loss of free air (air passing through the apparatus without becoming entrained in the confectionary mass) and without continually sampling the product and making numerous adjustments.

The product of the method is characterized by its uniform foam texture, which results from the use of a diffusion medium of prefabricated, standardized type, as well as by the employment of carefully controlled volumes and pressure.

Needless to say, the working time involved in my process is greatly reduced, compared to existing batch processes. The apparatus required is exceedingly simple and inexpensive and there are no moving parts of any type employed in the diffusion phase. The apparatus is readily cleaned and maintained in hygienic condition, there being no possibility of the admission of foreign matter or impurities during the processing. The diffuser sleeves or elements are readily removable for cleaning, as by the flow of steam or water therethrough, or by burning, and may be replaced with a diffuser element of different type or porosity with corresponding ease. A positive feed and control of ingredients is made possible since the procedure is not reliant upon a gravity feed of the candy stock and its attendant drawbacks.

I claim:

1. Apparatus for processing confectionery and like stock, comprising the combination of means for supplying a gaseous medium under pressure, means for supplying a mass of viscous liquid stock to be processed under pressure, a diffuser communicating with and supplied with said medium and stock by said means, said respective means for supplying gaseous medium and stock being operatively connected to one another to effect preliminary admixture of the medium and stock substantially prior to treatment by said diffuser, said diffuser comprising a rigid porous diffusion element disposed for passage of said preliminarily treated medium and stock therethrough under pressure, to thereby thoroughly admix the medium and stock and diffuse the former throughout the latter, and a receiving chamber in spaced relation to said element on the side thereof opposite that to which the medium and stock are supplied.

2. Apparatus for processing confectionery and like edible stock, comprising the combination of means for supplying a gaseous medium under pressure, means for supplying a mass of viscous liquid stock to be processed under pressure, and a diffuser communicating with and supplied with said medium and stock by said means, said respective means for supplying gaseous medium and stock being operatively connected to one another to effect preliminary admixture of the medium and stock substantially prior to treatment by said diffuser, said diffuser comprising a chamber, a rigid cylindrical porous diffusion element of substantial thickness disposed in said chamber for passage of said medium and stock therethrough under pressure, to thereby thoroughly admix the medium and stock and diffuse the former throughout the latter, said medium and stock being charged by said supply means to the interior of said element and the diffused stock being discharged from said element to said chamber for removal therefrom.

3. Apparatus of the type described, comprising means for supplying a gaseous diffusion medium and a viscous liquid stock under pressure, a diffusion member in communication with said supply means, comprising a diffusion element of porous, fused, ceramic material of substantial thickness, said supply means forcing said medium and stock through said element under pressure whereby to thoroughly intermix the stock and medium and diffuse the latter throughout the stock in the form of a multitude of minute globules, said diffusion element being of uniform thickness in the direction of passage of said medium and stock therethrough and a confining chamber surrounding the diffusion member and receiving the diffused stock therefrom.

4. Apparatus of the type described, comprising means for supplying a gaseous diffusion medium and a viscous liquid stock under pressure, a diffusion member in communication with said supply means, comprising a rigid hollow cylindrical diffusion element of porous material of substantial radial thickness, said supply means forcing said medium and stock through said element under pressure whereby to thoroughly intermix the stock and medium and diffusing the latter throughout the stock in the form of a multitude of minute globules through said diffusion element, and a confining chamber surrounding the diffusion member and receiving the diffused stock therefrom.

5. Apparatus of the type described, comprising means for supplying a gaseous diffusion medium and a viscous liquid stock under pressure, a diffusion member in communication with said supply means, comprising a rigid disk-like diffusion element of porous material of substantial thickness, said supply means forcing said medium and stock through said element under pressure whereby to thoroughly intermix the stock and medium and diffuse the latter throughout the stock in the form of a multitude of minute globules, and a confining chamber surrounding the diffusion member and receiving the diffused stock therefrom.

6. Apparatus for processing confectionery and like stock, comprising the combination of means for supplying a gaseous medium under pressure, means for supplying a mass of viscous liquid stock to be processed under pressure, a diffuser communicating with and supplied with said medium and stock by said means, said respective means for supplying gaseous medium and stock being operatively connected to one another to effect preliminary admixture of the medium and stock substantially prior to treatment by said diffuser, said diffuser comprising a rigid porous diffusion element disposed for passage of said preliminarily treated medium and stock therethrough under pressure, to thereby thoroughly admix the medium and stock and diffuse the former throughout the latter, and means to direct the flow of said mixture issuing from said element.

JUSTIN J. ALIKONIS.

REFERENCES CITED

The following references are of record in the file of this patent:

UNITED STATES PATENTS

| Number | Name | Date |
|---|---|---|
| 1,979,685 | Grindrod | Nov. 6, 1934 |
| 1,740,840 | Schnabel | Dec. 24, 1929 |
| 1,889,236 | Burmeister | Nov. 29, 1932 |
| 2,295,740 | Keen | Sept. 15, 1942 |
| 1,702,526 | Steeley | Feb. 19, 1929 |

FOREIGN PATENTS

| Number | Country | Date |
|---|---|---|
| 526,145 | Great Britain | Sept. 11, 1940 |
| 340,268 | Great Britain | Dec. 22, 1930 |